A. F. GRILLONE.
COMBINATION FILM CAMERA AND DEVELOPING TANK.
APPLICATION FILED JAN. 15, 1921.
1,424,816.
Patented Aug. 8, 1922.
2 SHEETS—SHEET 2.
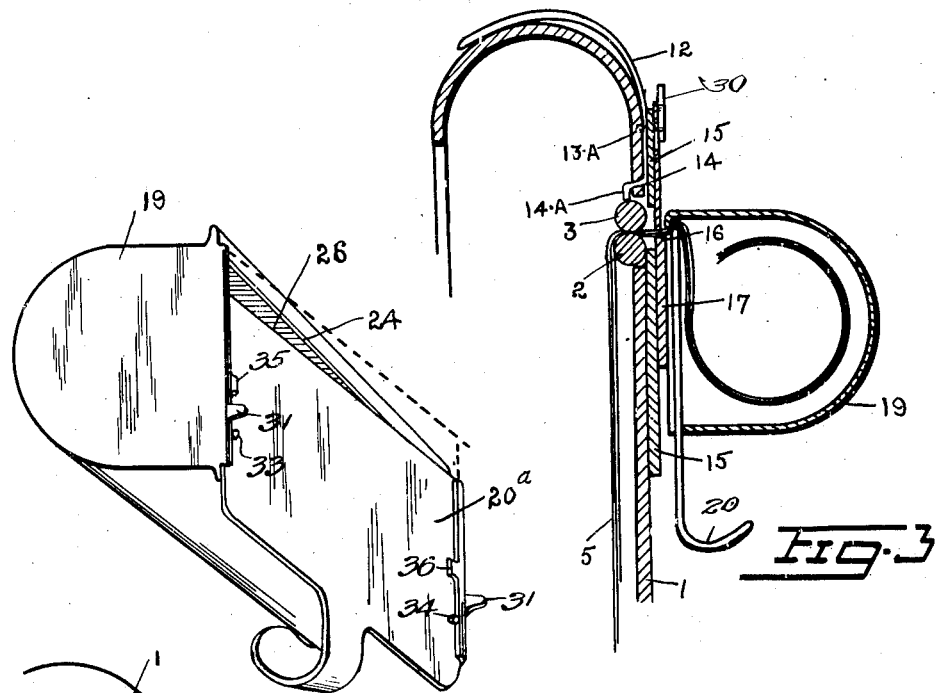
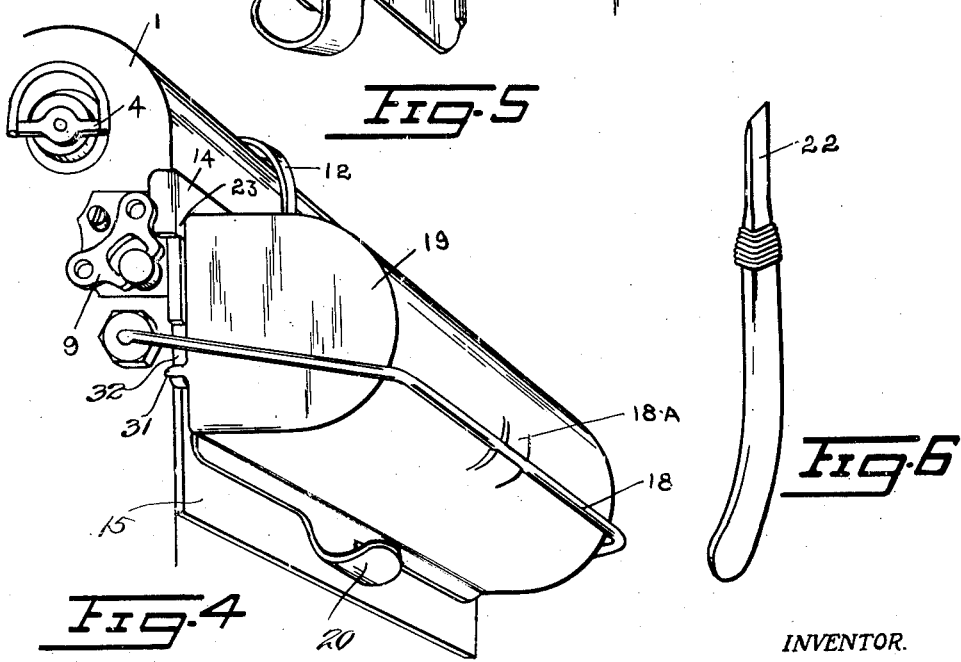
INVENTOR.
Anthony F. Grillone
BY Frank Keiper.
ATTORNEY.

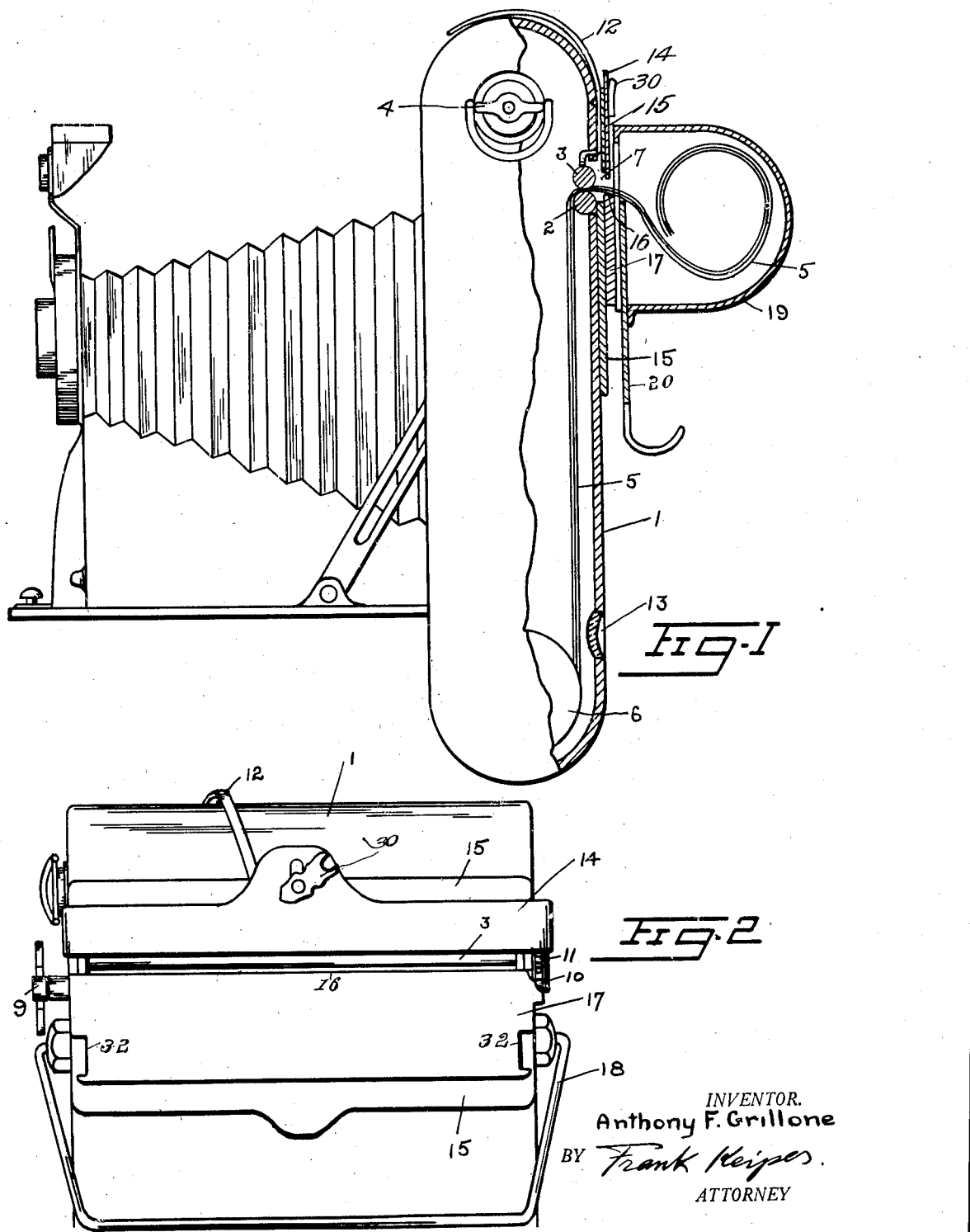

UNITED STATES PATENT OFFICE.

ANTHONY F. GRILLONE, OF ROCHESTER, NEW YORK.

COMBINATION FILM CAMERA AND DEVELOPING TANK.

1,424,816.  Specification of Letters Patent.  Patented Aug. 8, 1922.

Application filed January 15, 1921. Serial No. 437,574.

*To all whom it may concern:*

Be it known that I, ANTHONY F. GRILLONE, a subject of the King of Italy, residing at Rochester, in the county of Monroe and State of New York, have invented certain new and useful Improvements in Combination Film Cameras and Developing Tanks, of which the following is a specification.

The object of this invention is to provide a detachable developing tank for film cameras, in which the whole of the film, or any section thereof, can be developed as soon as exposures have been made thereon.

Another object of this invention is to provide means in the camera which enable the operator to advance the film after each exposure, feed the exposed section of the film into the developing tank mounted on the camera and then sever this portion of the film from the remainder of the film in the camera.

Another object of this invention is to provide means on the camera that permit the tank to be attached to the camera, locked in place thereon while the exposed section of the film is fed into it and then detached from the camera for the purpose of developing and fixing the section of the film fed into the tank.

This and other objects of this invention will be fully illustrated in the drawings, described in the specification and pointed out in the claims at the end thereof.

In the accompanying drawings:

Fig. 1 is a side elevation of a camera with the developing tank attached thereto, the camera being shown partly in section.

Fig. 2 is a rear elevation of the upper portion of the casing of the camera, showing the base to which the developing tank is attached to the camera and the means for holding the tank in place thereon.

Fig. 3 is a sectional view of the upper end of the casing of the camera and the developing tank mounted on the camera casing, showing a section of the film fed into the tank and ready to be severed from the remainder of the film contained in the camera.

Fig. 4 is a perspective view of the upper portion of the rear of the camera casing with the developing tank in place thereon.

Fig. 5 is a perspective view of a slightly modified form of the developing tank showing the cover for closing the tank after the film has been introduced therein.

Fig. 6 is a perspective view of the cutting knife used for severing the film section fed into the developing tank from the remainder of the film contained in the camera.

In the several figures of the drawing, like reference numerals indicate like parts.

One of the things that makes the film camera objectionable is the absence of means whereby each section of the film, as it is exposed, can be withdrawn from the camera and developed without the use of a dark room so that any section of the film containing an exposure can be examined as to its clearness soon after the exposure has been made. A new exposure can then be made of the same object in case the first one has turned out to be faulty as shown by the developed section of the film.

In my present invention, it is made possible to take a picture with a film camera, place the exposed section of the film on which the picture has been taken into a developing tank and sever it from the remainder of the film, this, too, without disturbing the remainder of the film so that the following sections of the film can be exposed in their proper turn and fed into the developing tank.

As shown in the drawing, the camera casing 1 is provided with a pair of rollers 2 and 3, which are mounted on the back of the casing near the winding key 4. The film 5 is unwound from the film spool 6 and is passed through these two rollers instead of being wound on an empty roll operated by the winding key 4. In so doing, the free end of the film is made to pass through the slot 7 provided in the back of the casing and into the developing tank 19. For the purpose of turning the rollers 2 and 3, the roller 2 is provided at one end with a winding key 9 which is mounted on the outside of the casing 1 and with which the roller can be turned. On the other end of the roller 2 is provided a small pinion 10 which is adapted to mesh with another small pinion 11 keyed to the end of the roller 3. In turning the winding key 9, both of the rollers are, therefore, rotated in unison.

Mounted on the casing 1 is a lever 12, which is pivoted at 13$^A$ and has its outer end curved to conform with the outline of the upper end of the camera casing. The inner end 14^A of the lever 12 is curved to project into the casing and make contact with the periphery of the roller 3. In passing the film 5 between the rollers 2 and 3, the lever 12 is first moved to one side to release the roller 3 so that it can be slightly separated from the roller 2 to allow the film to be inserted between them for a short distance. After this is done, the lever 12 is moved to make the inner end thereof come in contact with the roller 3 and force it against the roller 2. This, in turn, clamps the film between them so that on the turning of the winding key, the film is fed between the rollers through the slot 7.

The winding key 9 is turned to feed the film until the number separating each section of film is visible below the window 13 provided in the back of the camera just as is the case in the operation of the camera when the film is wound onto the roller operated by the winding key 4.

The slot 7 in the back of the camera is normally closed by the slide 14. This slide is mounted on the base 15 carried on the back of the camera and abuts against the raised shoulder 16 formed by the plate 17 mounted on the base 15. The shoulder 16 forms the lower edge of the slot 7 in the back of the casing and the edge of the slide 14 is adapted to come in contact therewith to close the opening 7 and pinch the free end of the film that has been fed through this opening between them.

For the purpose of locking the slide 14 in its closed position, which is shown in section in Fig. 3, a small cam 30 is mounted on the camera back which, when given a slight turn, clamps the slide against the back of the camera and thus locks it in place thereon.

Mounted in suitable bearings on each side of the camera casing 1 is a bale 18. This bale spans the back of the camera and is adapted to engage the latch plate 18^A carried on the back of the developing tank 19. In doing so, the developing tank 19 is forced against the base 15 and held in place thereon. The front side of the tank 19 is normally closed by the slide 20 which moves in suitable bearings provided on each side of the tank. After being clamped in place on the base 15 so that the tank occupies the position shown in Fig. 1, the slide 20 on the front side of the tank is slightly withdrawn to open the tank at a point opposite the slot 7 in the back of the camera. The winding key 9 is then turned by the operator so that the film section on which the exposure has been made, is gradually fed into the inside of the developing tank. The winding key is turned until the number indicating the next section of the film, appears in back of the sight opening 13. At this point, the whole of the exposed film section has been fed into the tank 19. The tank is then moved on the base 15 from the position shown in Fig. 1 to that shown in Fig. 3, while the slide 20 at the front side of the tank and the slide 14 at the back of the camera are closed. In doing so, the film is clamped against the shoulder 16 formed by the plate 17 and the knife blade 22 is then inserted into the slot 23 formed between the front edge of the developing tank and the slide 14. The cutting edge of the knife is then drawn over the film forced against the shoulder 16 at the point where the film leaves the casing and enters the tank, thus severing the exposed section of the film fed into the camera from the remainder of the film contained in the camera ready to be exposed for the next picture.

After the exposed film section has been placed into the developing tank 19, the tank is removed from the camera by disengaging the bale 18 from the latch plate 18^A. The developing solution may then be introduced into the tank and the film section developed therein according to the methods used in the ordinary developing tanks that are being used at the present time.

In the modified form of tank shown in Figure 5, instead of severing the film section by means of a separate knife blade, the slide 20^a, forming the bottom of the tank 19, may be provided with the cutting edge 26. This cutting edge is made to form a shear with the edge 24 of the tank so that on the closing of the tank, the slide will cut the film as the cutting edge 26 of the slide passes the stationary blade 24 of the tank.

When the exposed film is to be placed into the developing tank the tank is moved on the base 15 to the position shown in Figure 1 in which position the film is free to enter into the inside of the tank. After the film is inserted into the tank and the particular section is ready to be severed from the remainder of the film the tank is moved into the position illustrated in Figure 3 in which the inner edge of the tank is adapted to clamp the film between it and the shoulder 16. To provide a stop for the movement of the developing tank in either direction from the position shown in Figure 1 to that of Figure 3 a lug 31 is provided on the side of developing tank. This lug is adapted to engage into a groove 32 provided in the side of the base 15. The end of this groove serves as a stop for the lug provided on the tank and thus limits the movement of the tank for the purpose above pointed out.

The slide 20^a is provided with a pair of lugs 33 and 34. These lugs are attached on the outside of the slide close to the sides of the tank 19 and are adapted to come in contact with the lugs 35 and 36 respectively formed on the sides of the tank. These lugs on the slide and on the sides of the tank are provided to arrest the movement of the slide 20ᵃ as soon as it has closed the tank.

I claim:

1. A combination film camera and developing tank, comprising a camera, a detachable developing tank mounted at the back of said camera, means adapted to feed the exposed film from said camera into said tank, and means adapted to sever the film in said tank from the film in said camera, and means for releasing said developing tank with the severed film portion contained therein.

2. A combination film camera and developing tank comprising a camera, a base plate having a slot provided therein mounted at the back of said camera, a developing tank mounted on said base, a clamp provided on said camera and adapted to clamp said developing tank to said base, said developing tank having an opening in the front thereof adapted to register with the slot in said base, means to feed the film from said camera through the slot in said base and into the opening in said developing tank and means to sever the film in said developing tank from the film in said camera.

3. A combination film camera and developing tank comprising a camera, a pair of feed rollers mounted to rotate in said camera transversely thereof, said camera having a slot in the back thereof in line with the contact point between said feed rollers, a developing tank detachably mounted on the back of said camera, said developing tank having an opening in the front thereof, the opening in said developing tank being adapted to register with the slot in the back of said camera, said feed rollers being adapted to feed the film from said camera into said developing tank, a locking lever mounted on said camera, said rocking lever being adapted to lock said feed rollers against rotation and clamp the film between them.

4. A combination film camera and developing tank comprising a camera, a pair of feed rollers mounted to rotate in said camera, said camera having a slot in the back thereof in line with the axis of rotation of said feed rollers and their point of contact with each other, a base plate mounted at the back of said camera, a developing tank detachably mounted to said base and means to limit the movement of said developing tank on said base, a cover for said developing tank the slot in said camera being adapted to register with an opening in said developing tank normally closed by said cover of said developing tank, said developing tank being elevated from the back of said camera to permit the film fed from said camera to be severed between said developing tank and said camera.

5. A combination film camera and developing tank comprising a camera having a slot in the back thereof, a pair of feed rollers mounted in said camera parallel to the slot in the back of said camera, a base mounted on the back of said camera, said base having a slot provided therein parallel to and in line with the slot in the back of said camera, a slide on said base, said slide being adapted to open and close the slot in said base, a shoulder formed on said base adjacent to the slot provided in said base, a developing tank detachably mounted on said base with a space between it and said base, said feed rollers being adapted to feed the film from said camera through the slot in the back of said camera and the slot in said base and through the space between said base and said developing tank into said developing tank, the film being adapted to rest against said shoulder formed on said base, in passing from said camera into said developing tank.

6. A combination camera and developing tank comprising a camera, a developing tank detachably mounted at the back of said camera, a cover for said developing tank adapted to slide on said tank between said tank and said camera, a cutting edge on the end of said cover, said cutting edge being adapted to simultaneously sever a film fed from said camera into said tank and close said tank.

In testimony whereof I affix my signature.

ANTHONY F. GRILLONE.